United States Patent
Yang et al.

(10) Patent No.: US 12,476,540 B2
(45) Date of Patent: Nov. 18, 2025

(54) SINGLE-INDUCTOR MULTI-OUTPUT (SIMO) DIRECT CURRENT TO DIRECT CURRENT (DC-DC) BUCK CONVERTER

(71) Applicant: REALTEK SEMICONDUCTOR CORPORATION, Hsinchu (TW)

(72) Inventors: Wen-Hau Yang, Hsinchu (TW); Yen-Ting Lin, Hsinchu (TW); Chun-Yu Luo, Hsinchu (TW); Shih-Chieh Chen, Hsinchu (TW); Hung-Hsuan Cheng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 148 days.

(21) Appl. No.: 18/610,307

(22) Filed: Mar. 20, 2024

(65) Prior Publication Data
US 2024/0333155 A1    Oct. 3, 2024

(30) Foreign Application Priority Data

Mar. 29, 2023  (TW) .................................. 112111964

(51) Int. Cl.
*H02M 3/158* (2006.01)
*H02M 1/00* (2006.01)

(52) U.S. Cl.
CPC .......... *H02M 3/158* (2013.01); *H02M 1/009* (2021.05); *H02M 3/1582* (2013.01); *H02M 3/1584* (2013.01)

(58) Field of Classification Search
CPC .. H02M 3/158; H02M 3/1582; H02M 3/1584; H02M 1/009
See application file for complete search history.

(56) References Cited

U.S. PATENT DOCUMENTS

| | | | |
|---|---|---|---|
| 9,099,919 B2* | 8/2015 | Jing .................... | H02M 3/158 |
| 2012/0062031 A1* | 3/2012 | Buthker ............... | H02M 3/158 |
| | | | 307/31 |
| 2016/0294277 A1* | 10/2016 | Romeo ............... | H02M 3/1582 |
| 2020/0244167 A1* | 7/2020 | Delano ............... | H02M 3/1582 |

FOREIGN PATENT DOCUMENTS

| | | | | |
|---|---|---|---|---|
| CN | 111030454 A | * | 4/2020 | ............ H02M 3/157 |
| CN | 115485958 A | * | 12/2022 | .......... H02M 3/1582 |

* cited by examiner

*Primary Examiner* — Jue Zhang
*Assistant Examiner* — Jye-June Lee
(74) *Attorney, Agent, or Firm* — WPAT, PC (57) ABSTRACT

A single-inductor multi-output (SIMO) DC-DC buck converter includes a first switch, a second switch, a third switch, a fourth switch, an inductor, an error amplifier circuit, an inductor current ripple emulator circuit, a comparison circuit, and a control circuit. The error amplifier circuit generates a first error signal and a second error signal according to the output voltages of the SIMO DC-DC buck converter. The inductor current ripple emulator circuit generates a sensed voltage according to a first terminal voltage and a second terminal voltage of the inductor. The comparison circuit generates a first comparison result and a second comparison result according to the first error signal, the second error signal, and the sensed voltage. The control circuit generates first to fourth control signals for respectively controlling the first to fourth switches according to the first comparison result and the second comparison result.

11 Claims, 7 Drawing Sheets

SINGLE-INDUCTOR MULTI-OUTPUT (SIMO) DIRECT CURRENT TO DIRECT CURRENT (DC-DC) BUCK CONVERTER

BACKGROUND OF THE INVENTION

1. Field of the Invention

The present invention generally relates to a single-inductor multi-output (SIMO) direct current to direct current (DC-DC) buck converter.

2. Description of Related Art

Figure 1:
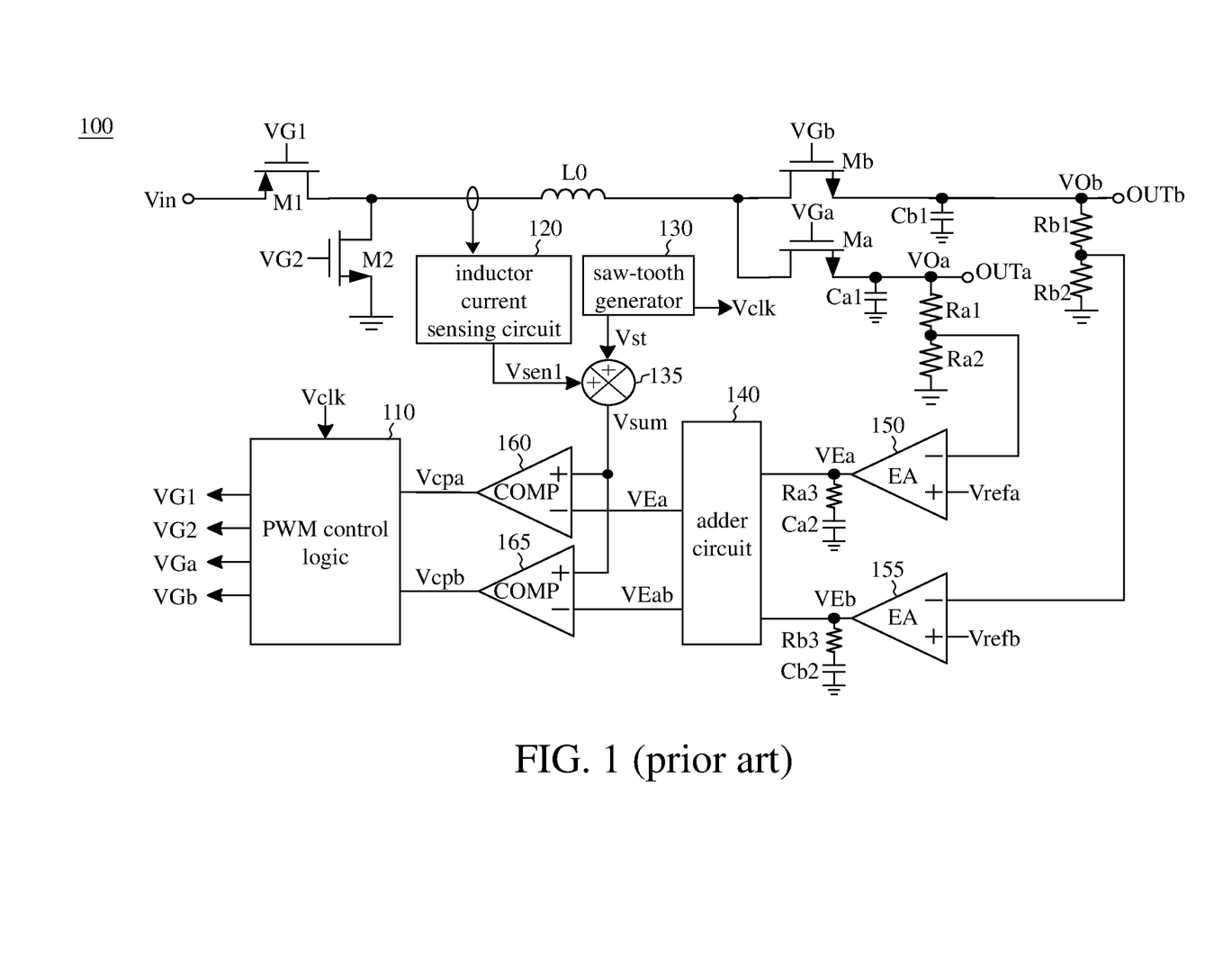
FIG. 1 is a circuit diagram of a conventional single-inductor multi-output (SIMO) direct current to direct current (DC-DC) buck converter.

FIG. 1 is a circuit diagram of a conventional single-inductor multi-output (SIMO) direct current to direct current (DC-DC) buck converter. It is assumed here that a conventional SIMO DC-DC buck converter 100 has two output terminals: an output terminal OUTa and an output terminal OUTb. The SIMO DC-DC buck converter 100 includes a pulse width modulation (PWM) control logic 110, an inductor current sensing circuit 120, a saw-tooth generator 130, an adder circuit 135, an adder circuit 140, an error amplifier (denoted "EA") 150, an error amplifier 155, a comparator (denoted "COMP") 160, a comparator 165, an inductor L0, a switch M1, a switch M2, a switch Ma, a switch Mb, a capacitor Ca1, a capacitor Cb1, a capacitor Ca2, a capacitor Cb2, a resistor Ra1, a resistor Ra2, a resistor Ra3, a resistor Rb1, a resistor Rb2, and a resistor Rb3.

The inductor current sensing circuit 120 is used to detect a current flowing through the inductor L0 to generate a sensed signal Vsen1. The saw-tooth generator 130 is used to generate a saw-tooth signal Vst and a clock Vclk. The adder circuit 135 is used to add the sensed signal Vsen1 and the saw-tooth signal Vst to generate an intermediate voltage Vsum. The error amplifier 150 compares a divided voltage of an output voltage VOa with a reference voltage Vrefa to generate an error signal VEa. The error amplifier 155 compares a divided voltage of an output voltage VOb with a reference voltage Vrefb to generate an error signal VEb. The adder circuit 140 adds the error signal VEa and the error signal VEb to generate a voltage VEab. The comparator 160 compares the intermediate voltage Vsum with the error signal VEa to generate a comparison result Vcpa. The comparator 165 compares the intermediate voltage Vsum with the voltage VEab to generate a comparison result Vcpb. The PWM control logic 110 generates a control signal VG1, a control signal VG2, a control signal VGa, and a control signal VGb according to the clock Vclk, the comparison result Vcpa, and the comparison result Vcpb. The control signal VG1, the control signal VG2, the control signal VGa, and the control signal VGb are used to control the switch M1, the switch M2, the switch Ma, and the switch Mb respectively.

Figure 2:
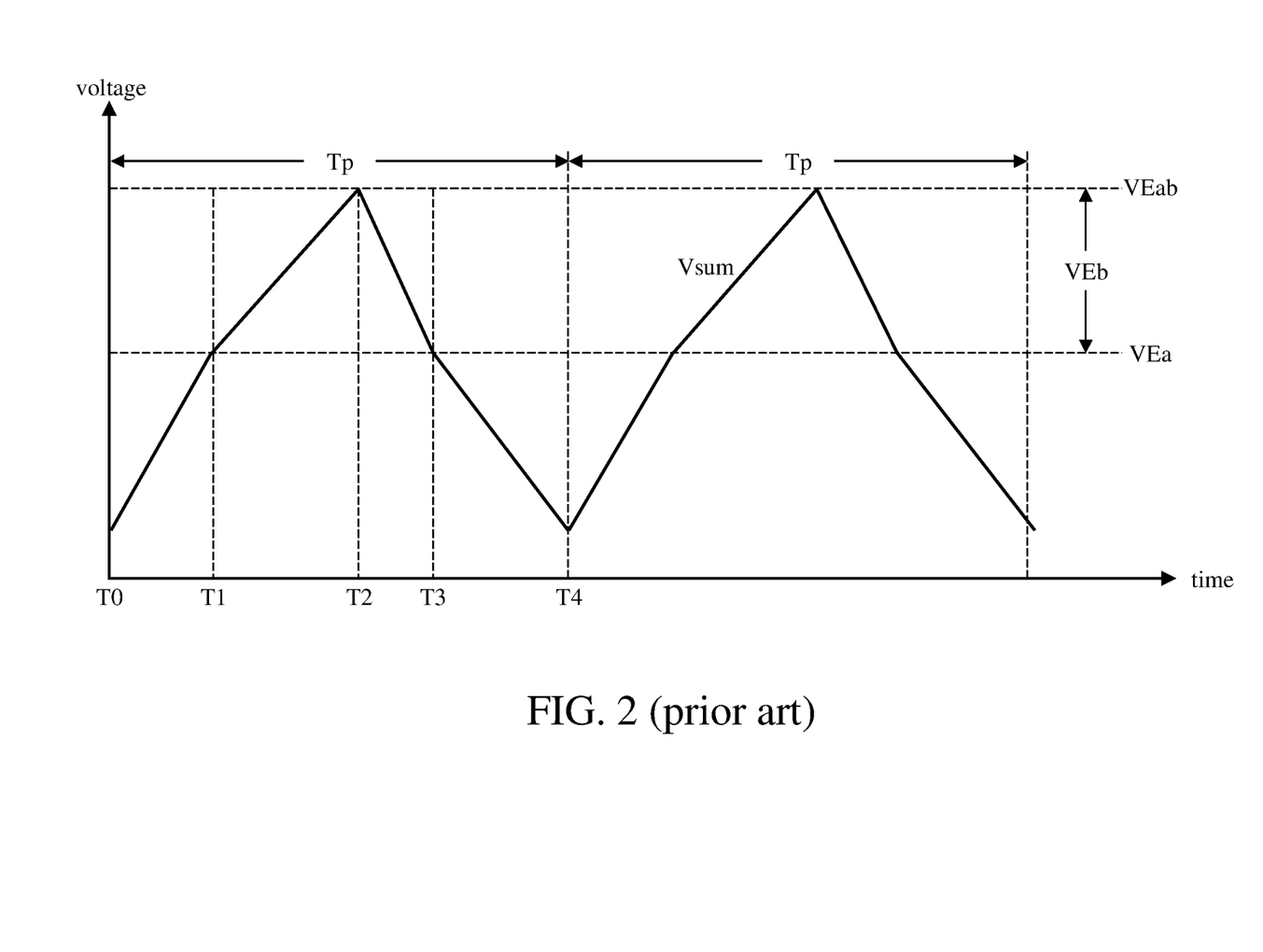
FIG. 2 is a schematic diagram of an energy distribution path of the SIMO DC-DC buck converter 100 in FIG. 1.

Reference is made to FIG. 2, which is a schematic diagram of an energy distribution path of the SIMO DC-DC buck converter 100 in FIG. 1. The intermediate voltage Vsum is proportional to the current flowing through the inductor L0. The error signal VEa is an error signal corresponding to the output voltage VOa at the output terminal OUTa. The error signal VEb is an error signal corresponding to the output voltage VOb at the output terminal OUTb. The voltage VEab is a sum of the error signal VEa and the error signal VEb. As shown in FIG. 2, in one cycle Tp, the SIMO DC-DC buck converter 100 sequentially performs the following operations: charging the output terminal OUTa (between the time point T0 and the time point T1), charging the output terminal OUTb (between the time point T1 and the time point T2), discharging the output terminal OUTb (between the time point T2 and the time point T3), and discharging the output terminal OUTa (between the time point T3 and the time point T4).

The error signal VEa and the voltage VEab respectively reflect the energy required at the output terminal OUTa and the output terminal OUTb. More specifically, when the intermediate voltage Vsum is less than the error signal VEa (e.g., between the time point T0 and the time point T1), the SIMO DC-DC buck converter 100 charges the output terminal OUTa. When the intermediate voltage Vsum is greater than the error signal VEa but less than the voltage VEab (e.g., between the time point T1 and the time point T2), the SIMO DC-DC buck converter 100 charges the output terminal OUTb. That is to say, the SIMO DC-DC buck converter 100 adjusts the duty ratio of the output terminal OUTa and the output terminal OUTb according to the magnitudes of the error signal VEa and the voltage VEab in a fixed cycle. In other words, the amount of energy outputted through the output terminal OUTa and the output terminal OUTb is determined by the magnitude of the corresponding error signal (i.e., the error signal VEa and the voltage VEab respectively).

However, in an application scenario where the output load changes rapidly, the magnitudes of the error signal VEa and the voltage VEab need to change significantly with different loads, causing the output voltages of the SIMO DC-DC buck converter 100 to be subject to severe cross regulation. This means that when the load on the output terminal OUTa changes rapidly, all of the error signals must resettle to different voltage values, disturbing the output terminal OUTb to such an extent that the output voltage at the output terminal OUTb will overshoot or undershoot, which in serious cases may trigger a circuit that follows to be reset or even damaged.

Furthermore, because the conventional SIMO DC-DC buck converter 100 is controlled based on PWM, the cycle Tp thereof is fixed. However, limited by a low bandwidth, the conventional SIMO DC-DC buck converter 100 has a slow transient response.

SUMMARY OF THE INVENTION

In view of the issues of the prior art, an object of the present invention is to provide a single-inductor multi-output (SIMO) direct current to direct current (DC-DC) buck converter, so as to make an improvement to the prior art.

According to one aspect of the present invention, a SIMO DC-DC buck converter is provided. The SIMO DC-DC buck converter includes a first switch, a second switch, a third switch, a fourth switch, an inductor, an error amplifier circuit, an inductor current ripple emulator circuit, a comparison circuit, and a control circuit. The first switch has a first terminal and a second terminal The first terminal receives an input signal. The second switch has a third terminal and a fourth terminal. The third terminal is coupled to the second terminal, and the fourth terminal is coupled to a reference voltage. The third switch has a fifth terminal and a sixth terminal. The sixth terminal outputs a first voltage. The fourth switch has a seventh terminal and an eighth terminal. The eighth terminal outputs a second voltage. The inductor has a ninth terminal and a tenth terminal. The ninth terminal is coupled to the second terminal and the third terminal, and the tenth terminal is coupled to the fifth terminal and the seventh terminal. The error amplifier circuit is configured to generate a first error signal and a second error signal according to the first voltage and the second voltage respectively. The inductor current ripple emulator circuit is coupled to the inductor and configured to generate a sensed voltage according to a first terminal voltage at the ninth terminal and a second terminal voltage at the tenth terminal of the inductor. The comparison circuit is coupled to the error amplifier circuit and the inductor current ripple emulator circuit and configured to generate a first comparison result and a second comparison result according to the first error signal, the second error signal, and the sensed voltage. The control circuit is coupled to the comparison circuit and configured to generate, according to the first comparison result and the second comparison result, a first control signal, a second control signal, a third control signal, and a fourth control signal that are used to control the first switch, the second switch, the third switch, and the fourth switch respectively.

According to another aspect of the present invention, a SIMO DC-DC buck converter is provided. The SIMO DC-DC buck converter includes a first switch, a second switch, a third switch, a fourth switch, an inductor, an error amplifier circuit, an inductor current ripple emulator circuit, and a control circuit. The first switch has a first terminal and a second terminal. The first terminal receives an input signal. The second switch has a third terminal and a fourth terminal. The third terminal is coupled to the second terminal, and the fourth terminal is coupled to a reference voltage. The third switch has a fifth terminal and a sixth terminal. The sixth terminal outputs a first voltage. The fourth switch has a seventh terminal and an eighth terminal. The eighth terminal outputs a second voltage. The inductor has a ninth terminal and a tenth terminal. The ninth terminal is coupled to the second terminal and the third terminal, and the tenth terminal is coupled to the fifth terminal and the seventh terminal. The error amplifier circuit is configured to generate a first error signal and a second error signal according to the first voltage and the second voltage respectively. The inductor current ripple emulator circuit is coupled to the inductor and configured to generate a sensed voltage according to a first terminal voltage at the ninth terminal and a second terminal voltage at the tenth terminal of the inductor. The control circuit is configured to generate, according to the sensed voltage, the first error signal, and the second error signal, a first control signal, a second control signal, a third control signal, and a fourth control signal that are used to control the first switch, the second switch, the third switch, and the fourth switch respectively. Each time the first error signal is greater than or equal to the sensed voltage, the control circuit controls the first switch to be turned on within a fixed time and controls the second switch to be turned off within the fixed time.

The technical means embodied in the embodiments of the present invention can solve at least one of the problems of the prior art. Therefore, compared to the prior art, the present invention can reduce the cross regulation performance and/or improve the transient response speed.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a single-inductor multi-output (SIMO) direct current to direct current (DC-DC) buck converter. On account of that some or all elements of the SIMO DC-DC buck converter could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

In the following discussion, each transistor has a first terminal, a second terminal, and a control terminal. When the transistor is used as a switch, the first terminal and the second terminal of the transistor are the two terminals of the switch, and the control terminal controls the switch to be turned on (the transistor is turned on) or turned off (the transistor is turned off). For a Metal-Oxide-Semiconductor Field-Effect Transistor (MOSFET), the first terminal may be one of the source and the drain, the second terminal may be the other of the source and the drain, and the control terminal is the gate. For a bipolar junction transistor (BJT), the first terminal may be one of the collector and the emitter, the second terminal may be the other of the collector and the emitter, and the control terminal is the base.

Figure 3:
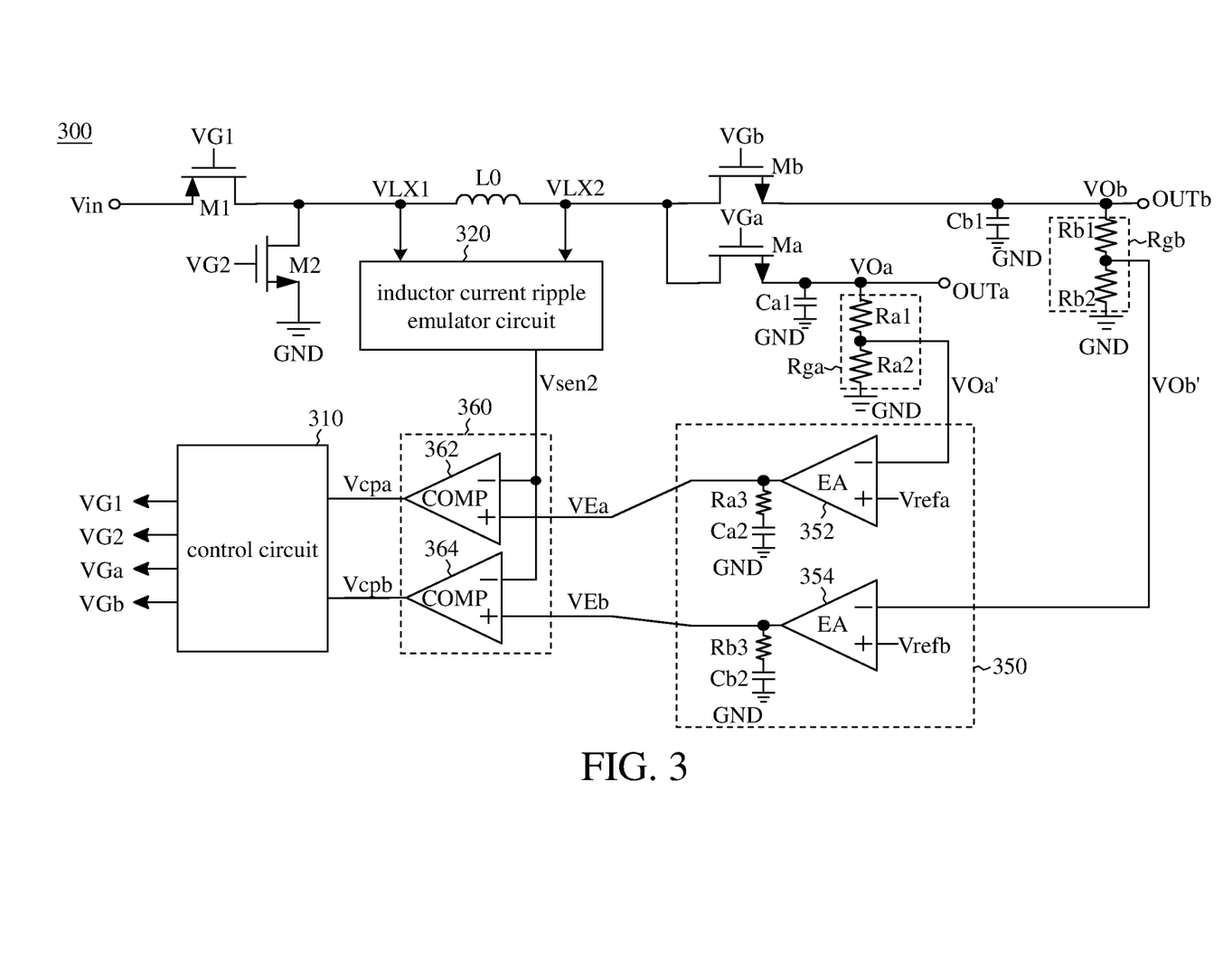
FIG. 3 is a functional block diagram of a SIMO DC-DC buck converter according to an embodiment of the present invention.

FIG. 3 is a functional block diagram of a SIMO DC-DC buck converter according to an embodiment of the present invention. A SIMO DC-DC buck converter 300 includes an inductor L0, a switch M1, a switch M2, a switch Ma, a switch Mb, a capacitor Ca1, a capacitor Ca2, a capacitor Cb1, a capacitor Cb2, a voltage dividing circuit Rga, a voltage dividing circuit Rgb, a resistor Ra3, a resistor Rb3, a control circuit 310, an inductor current ripple emulator circuit 320, an error amplifier circuit 350, and a comparison circuit 360.

In the embodiment of FIG. 3, the switch M1 is embodied by a P-channel Metal-Oxide-Semiconductor Field-Effect Transistor (hereinafter referred to as a PMOS transistor), and the switch M2, the switch Ma, and the switch Mb are all embodied by N-channel Metal-Oxide-Semiconductor Field-Effect Transistors (hereinafter referred to as NMOS transistors). However, this is for illustrative purposes only and is not a limitation of the scope of the invention.

A first terminal of the inductor L0 has a terminal voltage VLX1, and a second terminal of the inductor L0 has a terminal voltage VLX2. The inductor current ripple emulator circuit 320 generates a sensed voltage Vsen2 according to the terminal voltage VLX1 and the terminal voltage VLX2. The inductor current ripple emulator circuit 320 will be discussed in detail below with reference to FIG. 4.

The first terminal (e.g., the source) of the switch M1 receives an input signal Vin. The second terminal (e.g., the drain) of the switch M1 is coupled or electrically connected to the first terminal of the inductor L0. The control terminal (e.g., the gate) of the switch M1 receives a control signal VG1.

The first terminal (e.g., the source) of the switch M2 is coupled or electrically connected to a reference voltage GND (e.g., a ground level). The second terminal (e.g., the drain) of the switch M2 is coupled or electrically connected to the first terminal of the inductor L0. The control terminal (e.g., the gate) of the switch M2 receives a control signal VG2.

The first terminal (e.g., the drain) of the switch Ma is coupled or electrically connected to the second terminal of the inductor L0. The second terminal (e.g., the source) of the switch Ma is coupled or electrically connected to an output terminal OUTa. The control terminal (e.g., the gate) of the switch Ma receives a control signal VGa.

The first terminal (e.g., the drain) of the switch Mb is coupled or electrically connected to the second terminal of the inductor L0. The second terminal (e.g., the source) of the switch Mb is coupled or electrically connected to an output terminal OUTb. The control terminal (e.g., the gate) of the switch Mb receives a control signal VGb.

The capacitor Ca1 is coupled between the output terminal OUTa and the reference voltage GND. The Capacitor Cb1 is coupled between the output terminal OUTb and the reference voltage GND.

The voltage dividing circuit Rga is coupled between the output terminal OUTa and the reference voltage GND and includes a resistor Ra1 and a resistor Ra2. The voltage dividing circuit Rga is used to divide an output voltage VOa at the output terminal OUTa to generate a divided voltage VOa'. In other words, the divided voltage VOa' is proportional to the output voltage VOa.

The voltage dividing circuit Rgb is coupled between the output terminal OUTb and the reference voltage GND and includes a resistor Rb1 and a resistor Rb2. The voltage dividing circuit Rgb is used to divide the output voltage VOb at the output terminal OUTb to generate a divided voltage VOb'. In other words, the divided voltage VOb' is proportional to the output voltage VOb.

The error amplifier circuit 350 is used to generate an error signal VEa according to the divided voltage VOa' (i.e., equivalent to according to the output voltage VOa) and to generate an error signal VEb according to the divided voltage VOb' (i.e., equivalent to according to the output voltage VOb). More specifically, the error amplifier circuit 350 includes an error amplifier 352 and an error amplifier 354. The error amplifier 352 compares the divided voltage VOa' with the reference voltage Vrefa to generate the error signal VEa. The error amplifier 354 compares the divided voltage VOb' with the reference voltage Vrefb to generate the error signal VEb.

The error amplifier circuit 350 further includes the capacitor Ca2, the capacitor Cb2, the resistor Ra3, and the resistor Rb3. The capacitor Ca2 and the resistor Ra3 are connected in series between the output terminal of the error amplifier 352 and the reference voltage GND. The capacitor Cb2 and the resistor Rb3 are connected in series between the output terminal of the error amplifier 354 and the reference voltage GND.

The comparison circuit 360 is used to generate a comparison result Vcpa and a comparison result Vcpb according to the error signal VEa, the error signal VEb, and the sensed voltage Vsen2. More specifically, the comparison circuit 360 includes a comparator 362 and a comparator 364. The comparator 362 compares the sensed voltage Vsen2 and the error signal VEa to generate the comparison result Vcpa. The comparator 364 compares the sensed voltage Vsen2 with the error signal VEb to generate the comparison result Vcpb.

The control circuit 310 generates the control signal VG1, the control signal VG2, the control signal VGa, and the control signal VGb according to the comparison result Vcpa and the comparison result Vcpb. The operational details of the control circuit 310 will be discussed in detail below with reference to FIG. 5.

Figure 4:
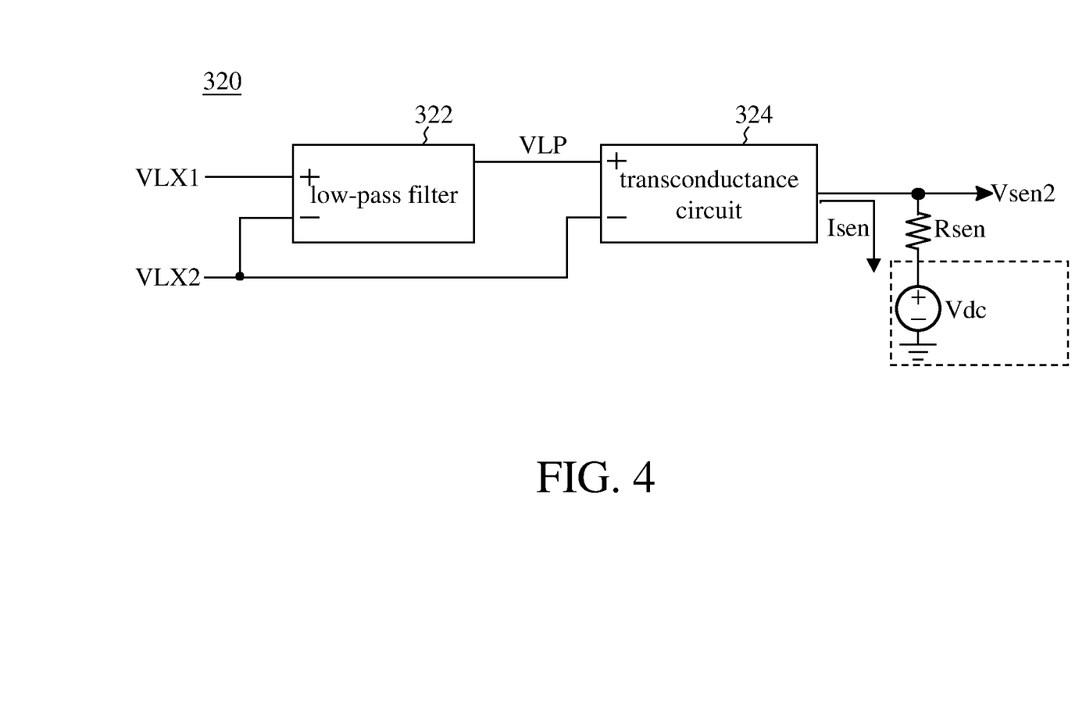
FIG. 4 is a functional block diagram of an inductor current ripple emulator circuit according to an embodiment of the present invention.

Reference is made to FIG. 4, which is a functional block diagram of the inductor current ripple emulator circuit according to an embodiment of the present invention. The inductor current ripple emulator circuit 320 includes a low-pass filter 322, a transconductance circuit 324, a resistor Rsen, and a DC power supply Vdc. The low-pass filter 322 is used to perform a low-pass filtering operation on the terminal voltage VLX1 and the terminal voltage VLX2 to generate a filtered voltage VLP. The transconductance circuit 324 converts the difference between the filtered voltage VLP and the terminal voltage VLX2 into a sensed current Isen according to equation (1), where gm is a transconductance coefficient. Therefore, the sensed current Isen can flow through the resistor Rsen to form the sensed voltage Vsen2. As the operating principles of the low-pass filter 322 and the transconductance circuit 324 are well known to people having ordinary skill in the art, the details are omitted for brevity.

$$Isen = gm * (VLP - VLX2) \qquad (1)$$

$$Vsen2 = Isen * Rsen + Vdc \qquad (2)$$

The purpose of the inductor current ripple emulator circuit 320 is to generate a signal (i.e., the sensed voltage Vsen2, as shown in equation (2)) that emulates a current ripple of the inductor L0. In other words, the sensed voltage Vsen2 can reflect the current ripple of the inductor L0 but does not contain a DC component. Thereby, the SIMO DC-DC buck converter 300 can stably operate in the continuous conduction mode (CCM) and the discontinuous conduction mode (DCM).

A DC level of the sensed voltage Vsen2 is determined by the DC power supply Vdc. In some embodiments, Vdc may be 0 volts. Since the DC level of the sensed voltage Vsen2 is not changed by the DC component of the current of the inductor L0, magnitudes of the error signal VEa and the error signal VEb do not change significantly with different loads, resulting in good cross regulation performance of the SIMO DC-DC buck converter 300.

Figure 5:
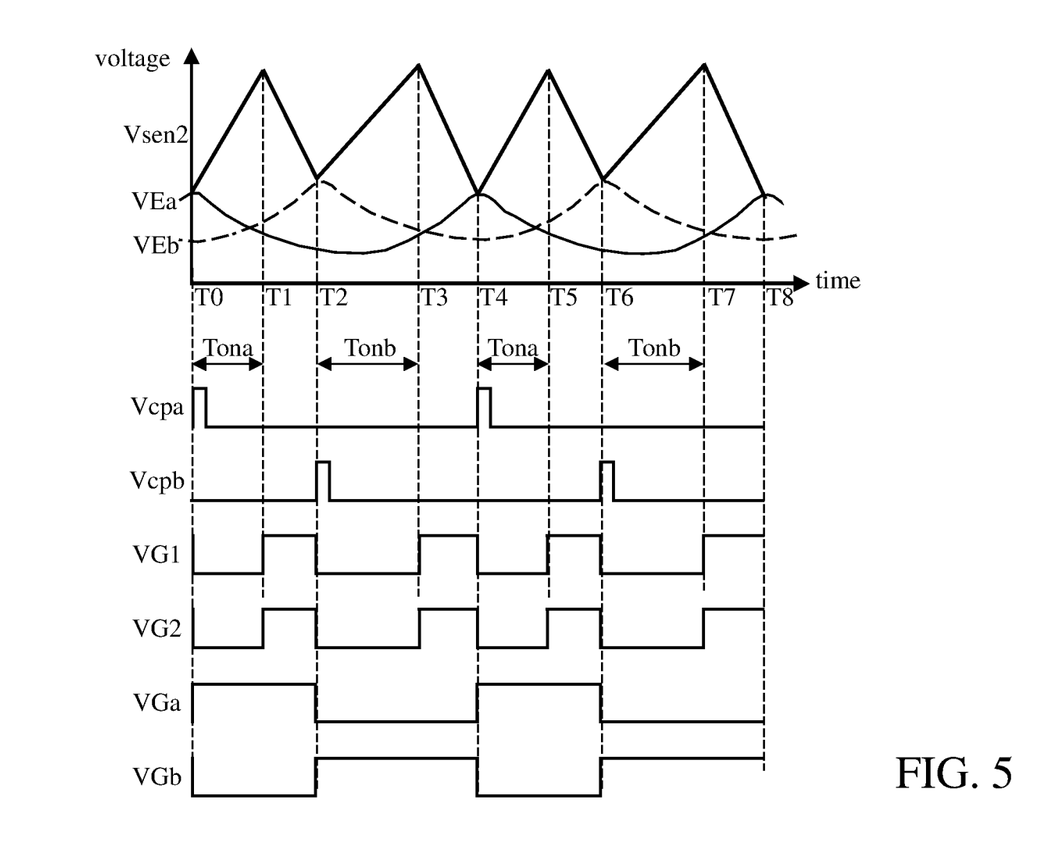
FIG. 5 shows waveforms of a sensed voltage and error signals, as well as a timing diagram of comparison results and multiple control signals according to an embodiment of the present invention.

Reference is made to FIG. 5, which shows waveforms of the sensed voltage Vsen2, the error signal VEa, and the error signal VEb, as well as a timing diagram of the comparison results (Vcpa, Vcpb) and multiple control signals (VG1, VG2, VGa, VGb) according to an embodiment of the present invention.

When the control circuit 310 detects that the comparison result Vcpa indicates that the error signal VEa is greater than or equal to the sensed voltage Vsen2 (e.g., the comparator 362 generates a pulse corresponding to the time point T0 or the time point T4), the SIMO DC-DC buck converter 300 charges the output terminal OUTa for a fixed time Tona. More specifically, within the fixed time Tona, the switch M1 is turned on (e.g., the control circuit 310 controls the control signal VG1 to change from a high level to a low level), the switch M2 is turned off (e.g., the control circuit 310 controls the control signal VG2 to change from the high level to the low level), the switch Ma is turned on (e.g., the control circuit 310 controls the control signal VGa to change from the low level to the high level), and the switch Mb is turned off (e.g., the control circuit 310 controls the control signal VGb to change from the high level to the low level).

Continuing the previous paragraph, when the fixed time Tona ends (corresponding to the time point T1 or the time point T5), the switch M1 is turned off (e.g., the control circuit 310 controls the control signal VG1 to be at the high level), the switch M2 is turned on (e.g., the control circuit 310 controls the control signal VG2 is at the high level), the switch Ma remains on (e.g., the control circuit 310 maintains the control signal VGa at the high level), and the switch Mb remains off (e.g., the control circuit 310 maintains the control signal VGb at the low level), causing the output terminal OUTa to discharge through the switch M2 (as a result, the output voltage VOa and the divided voltage VOa' become smaller). The discharge process continues until the error signal VEb is greater than or equal to the sensed voltage Vsen2 (corresponding to the time point T2 or the time point T6) or the error signal VEa is greater than or equal to the sensed voltage Vsen2 again. Note that the duration of the discharge process (i.e., T2-T1 or T6-T5) is not a fixed value.

When the control circuit 310 detects that the comparison result Vcpb indicates that the error signal VEb is greater than or equal to the sensed voltage Vsen2 (e.g., the comparator 364 generates a pulse corresponding to the time point T2 or the time point T6), the SIMO DC-DC buck converter 300 charges the output terminal OUTb for a fixed time Tonb. More specifically, within the fixed time Tonb, the switch M1 is turned on, the switch M2 is turned off, the switch Ma is turned off (e.g., the control circuit 310 controls the control signal VGa to change from the high level to the low level), and the switch Mb is turned on (e.g., the control circuit 310 controls the control signal VGb to change from the low level to the high level).

Continuing the previous paragraph, when the fixed time Tonb ends (corresponding to the time point T3 or the time point T7), the switch M1 is turned off, the switch M2 is turned on, the switch Ma remains off (e.g., the control circuit 310 maintains the control signal VGa at the low level), and the switch Mb remains on (e.g., the control circuit 310 maintains the control signal VGb at the high level), causing the output terminal OUTb to discharge through the switch M2 (as a result, the output voltage VOb and the divided voltage VOb' become smaller). The discharge process continues until the error signal VEa is greater than or equal to the sensed voltage Vsen2 (corresponding to the time point T4 or the time point T8) or the error signal VEb is greater than or equal to the sensed voltage Vsen2 again. Note that the duration of the discharge process (i.e., T4-T3 or T8-T7) is not a fixed value.

Since the fixed time Tona and the fixed time Tonb are fixed values, the control circuit 310 may also be referred to as a constant on time (COT) control circuit.

In some embodiments, the fixed time Tona (or the fixed time Tonb) may be proportional to the reciprocal of the input signal Vin or to the reciprocal of the difference between the input signal Vin and output voltage VOa (or the output voltage VOb) (i.e., proportional to 1/(Vin−VOa) or 1/(Vin−VOb)).

Figure 6:
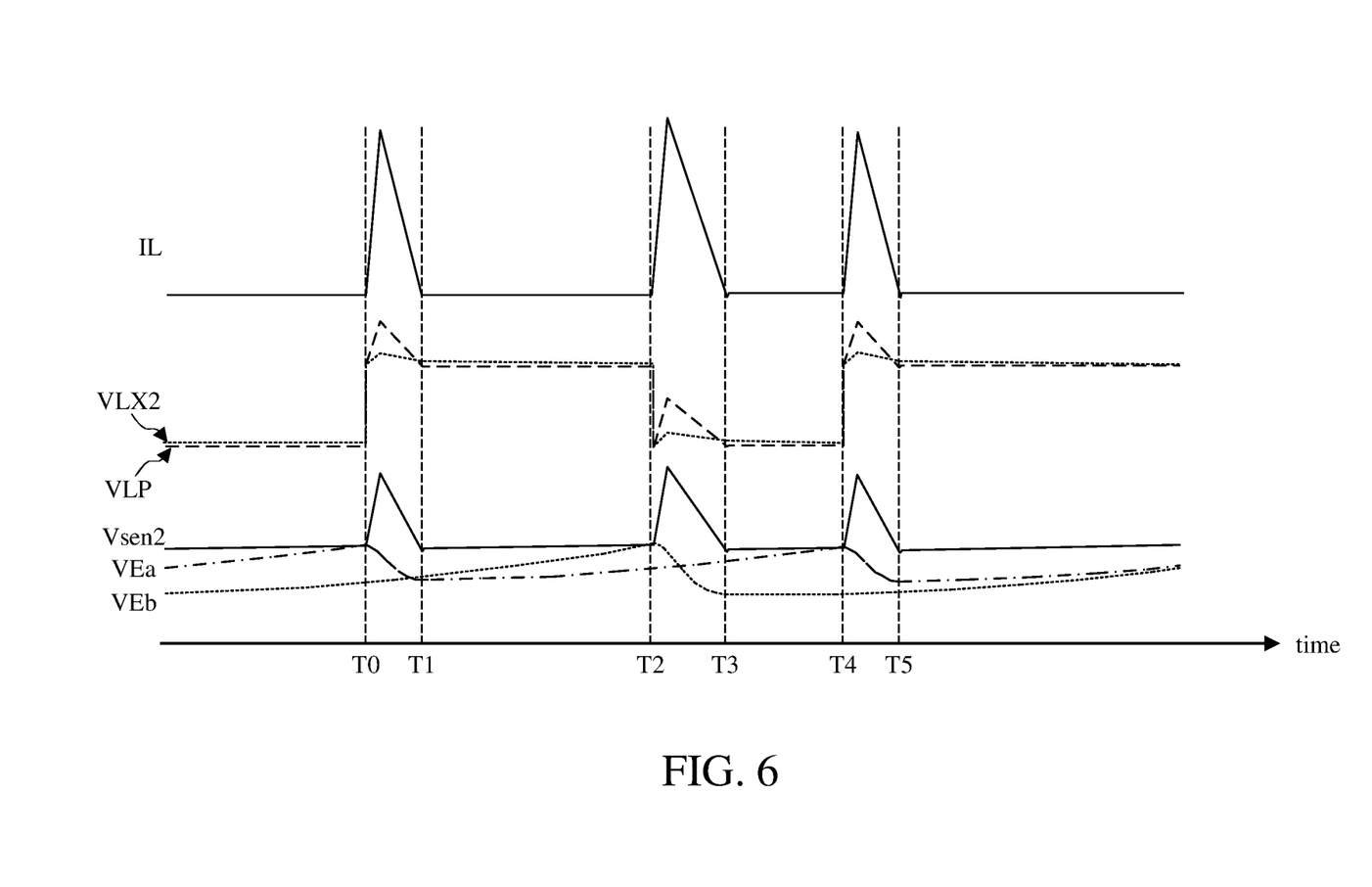
FIG. 6 shows waveforms of an inductor current, a terminal voltage of an inductor, a filtered voltage, a sensed voltage, and error signals according to an embodiment of the present invention.

Reference is made to FIG. 6, which shows waveforms of the inductor current IL, the terminal voltage VLX2 of the inductor L0, the filtered voltage VLP, the sensed voltage Vsen2, and the error signals (VEa, VEb) according to an embodiment of the present invention. As shown in FIG. 6, when the inductor current IL (i.e., the current flowing through the inductor L0) is not 0 (e.g., between the time point T0 and the time point T1, between the time point T2 and the time point T3, or between the time point T4 and the time point T5), the terminal voltage VLX2, the filtered voltage VLP, and the sensed voltage Vsen2 change correspondingly. The difference between the filtered voltage VLP and the terminal voltage VLX2 can reflect the current ripple of the inductor current IL. It can be seen from equations (1) and (2) that since the DC power supply Vdc, the resistor Rsen, and the transconductance coefficient gm are fixed values, the sensed voltage Vsen2 can also reflect the current ripple of the inductor current IL.

Compared to the clock-triggered SIMO DC-DC buck converter 100 of FIG. 1 (i.e., a PWM control-based SIMO DC-DC buck converter), the SIMO DC-DC buck converter 300 provided in the present invention is an event-triggered SIMO DC-DC buck converter. That is to say, the SIMO DC-DC buck converter 300 charges the output terminal OUTa or the output terminal OUTb only when that output terminal requires energy (i.e., the error signal VEa or the error signal VEb is greater than or equal to the sensed voltage Vsen2). Therefore, the SIMO DC-DC buck converter 300 of the present invention can achieve a faster transient response speed.

Furthermore, because the sensed voltage Vsen2 can reflect the current ripple of the inductor L0 but does not contain the DC component, the magnitudes of the error signal VEa and the error signal VEb do not change significantly in response to rapid changes in the load, resulting in good cross regulation performance of the SIMO DC-DC buck converter 300.

In some embodiments, the control circuit 310 may be embodied by a logic circuit. People having ordinary skill in the art can implement the control circuit 310 based on the above discussions.

Figure 7:
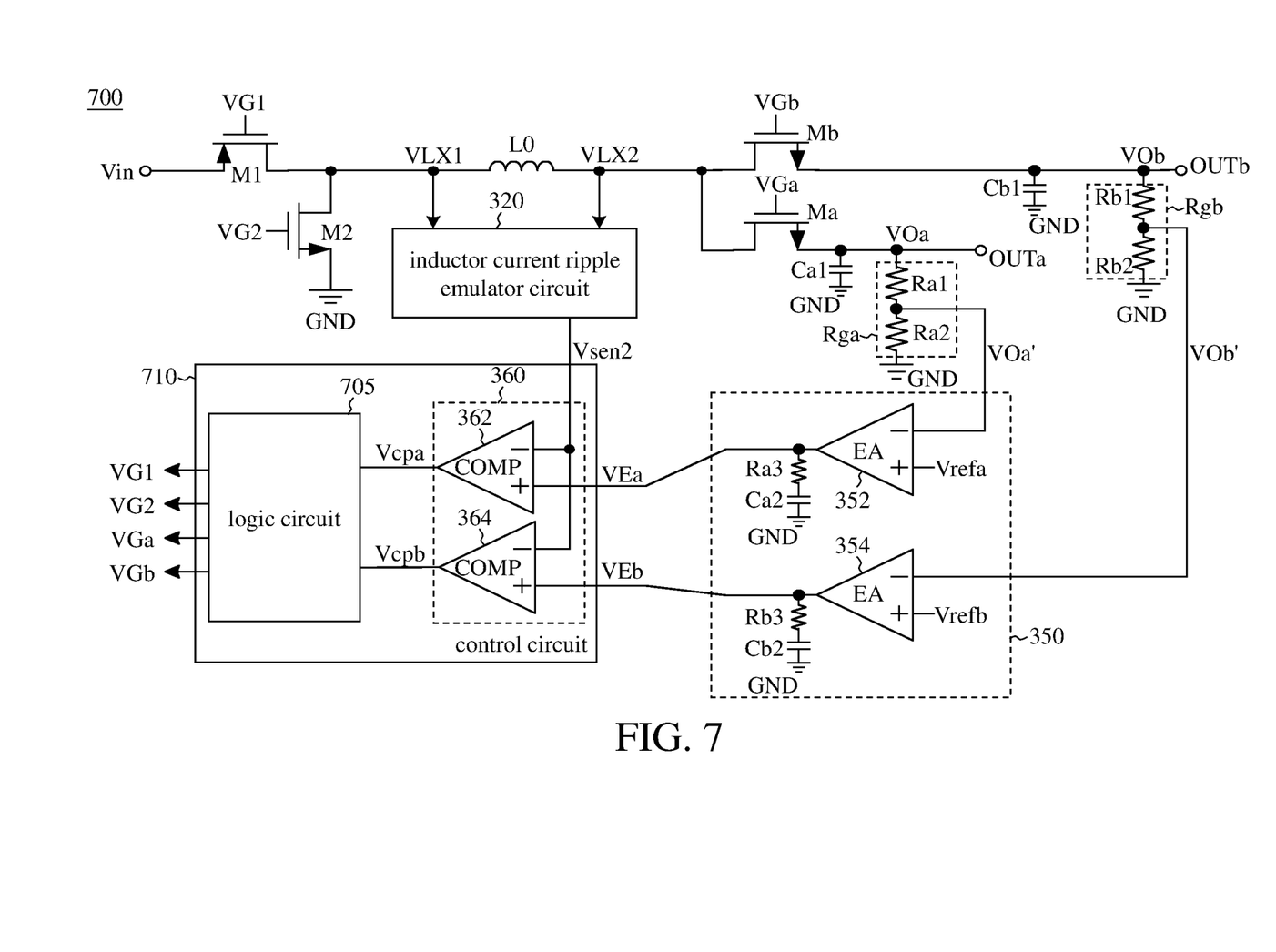
FIG. 7 is a functional block diagram of a SIMO DC-DC buck converter according to another embodiment of the present invention.

Reference is made to FIG. 7, which is a functional block diagram of a SIMO DC-DC buck converter according to another embodiment of the present invention. The SIMO DC-DC buck converter 700 is similar to the SIMO DC-DC buck converter 300, except that the control circuit 710 includes a logic circuit 705 and a comparison circuit 360. The logic circuit 705 is similar or identical to the control circuit 310. That is to say, the control circuit 710 can directly control the switch M1, the switch M2, the switch Ma, and the switch Mb according to the sensed voltage Vsen2, the error signal VEa, and the error signal VEb.

The number of output terminals (which is two in the above discussions) is intended to illustrate the invention by way of example and not to limit the scope of the claimed invention. People having ordinary skill in the art may apply the present invention to SIMO DC-DC buck converters having more output terminals in accordance with the foregoing discussions.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Note that the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A single-inductor multi-output (SIMO) direct current to direct current (DC-DC) buck converter, comprising:
    a first switch having a first terminal and a second terminal, wherein the first terminal receives an input signal;
    a second switch having a third terminal and a fourth terminal, wherein the third terminal is coupled to the second terminal, and the fourth terminal is coupled to a reference voltage;
    a third switch having a fifth terminal and a sixth terminal, wherein the sixth terminal outputs a first voltage;
    a fourth switch having a seventh terminal and an eighth terminal, wherein the eighth terminal outputs a second voltage;
    an inductor having a ninth terminal and a tenth terminal, wherein the ninth terminal is coupled to the second terminal and the third terminal, and the tenth terminal is coupled to the fifth terminal and the seventh terminal;
    an error amplifier circuit configured to generate a first error signal and a second error signal according to the first voltage and the second voltage respectively;
    an inductor current ripple emulator circuit coupled to the inductor and configured to generate a sensed voltage according to a first terminal voltage at the ninth terminal and a second terminal voltage at the tenth terminal of the inductor;
    a comparison circuit coupled to the error amplifier circuit and the inductor current ripple emulator circuit and configured to generate a first comparison result and a second comparison result according to the first error signal, the second error signal, and the sensed voltage; and
    a control circuit coupled to the comparison circuit and configured to generate, according to the first comparison result and the second comparison result, a first control signal, a second control signal, a third control signal, and a fourth control signal that are used to control the first switch, the second switch, the third switch, and the fourth switch respectively.

2. The SIMO DC-DC buck converter of claim 1, wherein when the first error signal is greater than or equal to the sensed voltage, the control circuit controls the first switch and the third switch to change from off to on to increase the first voltage.

3. The SIMO DC-DC buck converter of claim 2, wherein the inductor current ripple emulator circuit comprises:
    a low-pass filter coupled to the inductor and configured to low-pass filter the first terminal voltage and the second terminal voltage to generate a filtered voltage;
    a resistor; and
    a transconductance circuit coupled to the low-pass filter and the resistor and configured to generate a sensed current according to the filtered voltage and the second terminal voltage;
    wherein the sensed current flows through the resistor to form the sensed voltage.

4. The SIMO DC-DC buck converter of claim 2, wherein the error amplifier circuit comprises:
    a first error amplifier configured to generate the first error signal according to the first voltage and a first reference voltage; and
    a second error amplifier configured to generate the second error signal according to the second voltage and a second reference voltage.

5. The SIMO DC-DC buck converter of claim 2, wherein the comparison circuit compares the first error signal and the sensed voltage to generate the first comparison result and compares the second error signal and the sensed voltage to generate the second comparison result.

6. The SIMO DC-DC buck converter of claim 2, wherein the comparison circuit comprises:
    a first comparator configured to compare the sensed voltage and the first error signal to generate the first comparison result; and
    a second comparator configured to compare the sensed voltage and the second error signal to generate the second comparison result.

7. A single-inductor multi-output (SIMO) direct current to direct current (DC-DC) buck converter, comprising:
    a first switch having a first terminal and a second terminal, wherein the first terminal receives an input signal;
    a second switch having a third terminal and a fourth terminal, wherein the third terminal is coupled to the second terminal, and the fourth terminal is coupled to a reference voltage;
    a third switch having a fifth terminal and a sixth terminal, wherein the sixth terminal outputs a first voltage;
    a fourth switch having a seventh terminal and an eighth terminal, wherein the eighth terminal outputs a second voltage;
    an inductor having a ninth terminal and a tenth terminal, wherein the ninth terminal is coupled to the second terminal and the third terminal, and the tenth terminal is coupled to the fifth terminal and the seventh terminal;

an error amplifier circuit configured to generate a first error signal and a second error signal according to the first voltage and the second voltage respectively;

an inductor current ripple emulator circuit coupled to the inductor and configured to generate a sensed voltage according to a first terminal voltage at the ninth terminal and a second terminal voltage at the tenth terminal of the inductor; and a control circuit configured to generate, according to the sensed voltage, the first error signal, and the second error signal, a first control signal, a second control signal, a third control signal, and a fourth control signal that are used to control the first switch, the second switch, the third switch, and the fourth switch respectively;

wherein each time the first error signal is greater than or equal to the sensed voltage, the control circuit controls the first switch to be turned on within a fixed time and controls the second switch to be turned off within the fixed time.

8. The SIMO DC-DC buck converter of claim 7, wherein each time the first error signal is greater than or equal to the sensed voltage, the control circuit further controls the third switch to be turned on within the fixed time and controls the fourth switch to be turned off within the fixed time, and after the fixed time ends, the control circuit further controls the first switch to be turned off, the second switch to be turned on, the third switch to be turned on, and the fourth switch to be turned off.

9. The SIMO DC-DC buck converter of claim 7, wherein when the first error signal is equal to the sensed voltage, the control circuit controls the first switch and the third switch to change from off to on to increase the first voltage.

10. The SIMO DC-DC buck converter of claim 9, wherein the inductor current ripple emulator circuit comprises:

a low-pass filter coupled to the inductor and configured to low-pass filter the first terminal voltage and the second terminal voltage to generate a filtered voltage;

a resistor; and a transconductance circuit coupled to the low-pass filter and the resistor and configured to generate a sensed current according to the filtered voltage and the second terminal voltage;

wherein the sensed current flows through the resistor to form the sensed voltage.

11. The SIMO DC-DC buck converter of claim 9, wherein the control circuit comprises:

a first comparator configured to compare the sensed voltage and the first error signal to generate a first comparison result; and a second comparator configured to compare the sensed voltage and the second error signal to generate a second comparison result;

wherein the control circuit controls levels of the first control signal, the second control signal, the third control signal, and the fourth control signal according to the first comparison result, the second comparison result, and the fixed time.

* * * * *